Oct. 14, 1952  C. F. WHITAKER  2,613,425
BOBBIN STRIPPING APPARATUS
Filed Aug. 11, 1949  7 Sheets-Sheet 1

Fig.1

Inventor
Carl F. Whitaker
by Roberts, Cushman & Grover
attys.

Fig. 3

Oct. 14, 1952     C. F. WHITAKER     2,613,425
BOBBIN STRIPPING APPARATUS Filed Aug. 11, 1949     7 Sheets—Sheet 4

Oct. 14, 1952 C. F. WHITAKER 2,613,425
BOBBIN STRIPPING APPARATUS
Filed Aug. 11, 1949 7 Sheets-Sheet 5

Fig. 6

Inventor
Carl F. Whitaker
by Roberts, Cushman & Grover
att'ys.

UNITED STATES PATENT OFFICE 2,613,425

BOBBIN STRIPPING APPARATUS

Carl F. Whitaker, Beverly, Mass.

Application August 11, 1949, Serial No. 109,770

17 Claims. (Cl. 28—19)

This invention relates to textile machinery and more particularly to apparatus for stripping the yarn or thread from bobbins.

It is the principal object of this invention to provide a machine which completely and automatically strips the threads from any type of bobbin whether full wound, partially wound or tails without damage to the bobbin thereby eliminating the slow and expensive manual stripping now employed.

Further objects are to provide a machine which removes thread and lint from the spindle hole of the bobbin, which will accommodate several bobbins simultaneously, which is adaptable to accommodate bobbins of different lengths, which requires a minimum of maintenance and servicing, which is rapid and positive in operation, which does not require a skilled operator, and which advances generally the art to which it is related.

In a broad aspect the invention contemplates apparatus comprising holding means for releasably holding a bobbin and thread stripping means having instrumentalities such as a plough and a knife, which may be either rotary or stationary, for severing the thread wound upon the bobbin. Means are also provided for effecting relative movement between the holding means and the stripping means so that the instrumentalities are brought into operating engagement with the thread upon the bobbin.

In another broad aspect the invention contemplates apparatus comprising a magazine having provision for holding a plurality of bobbins. Means, for example a Geneva movement, are provided for moving the magazine either linearly or rotatably, successively to present the bobbins held in the magazine to a plurality of work stations. Included among such stations are a bobbin loading station and a station wherein are combined the thread stripping and bobbin unloading operations. Means are also provided for removing the bobbins from the unloading station after the thread has been stripped therefrom.

In one specific aspect the magazine for the bobbins comprises two axially aligned discs, one of which has a plurality of apertures circumferentially located at equally spaced intervals for receiving ends of the respective bobbins. The opposite ends of the respective bobbins are held in radially disposed recesses in the second disc, which recesses correspond in axial alignment with the apertures in the first disc. Such axial alignment is maintained by means of a shaft which connects the discs. A cover member is positioned to enclose the periphery of the recessed disc so that the bobbin ends are restrained in the respective recesses during rotation of the magazine. The rotation of the magazine is preferably, although not necessarily, provided by a Geneva movement, the roll thereof engaging radial slots provided in one of the discs. The Geneva movement provides intermittent rotation to the magazine so that the operator can manually feed bobbins to the magazine at the loading station through a slot in the cover which permits the ends of the respective bobbins to be dropped into a disc recess after the opposite end of the bobbin has been inserted in the corresponding aperture in the other disc.

In another aspect the bobbins are removed from the unloading station by means of a plunger which may be operated in synchronism with the rotation of the magazine so that a rapid return stroke may be provided. The operation of the plunger by means of a cam or otherwise forces the bobbin in the unloading station into a hollow member which is provided with a detent for restraining the removed bobbin so that the plunger can be withdrawn.

A salient feature of the invention is a thread stripping station which may be combined with the unloading station, wherein a power driven rotary knife is provided for cutting the thread from the bobbin. A plow is oppositely disposed to the knife for removing the severed threads. To prevent damage to the bobbin the knife is preferably pivotally supported between the bifurcated portions of a presser foot. The relative position of the knife and foot, which is determined by an adjustable stop, is yieldably maintained by spring means. Other spring means are provided to move pivotally the foot into contact with the bobbin at its neck to pick up any threads not cut by the sloughing knife. A tripping latch withholds the foot from dropping onto the bobbin during the movement of the magazine and is tripped only if a bobbin is in that portion of the magazine that is moving into the stripping station from its previous station.

Another aspect of the invention is a sloughing station for ripping open the end of fully or partially wound bobbins, thereby aiding the starting of the rotary knife through the package. In a preferred embodiment the sloughing station includes a yieldable cantilever member secured at one end to the frame of the device. A series of teeth are provided at the free end of the cantilever member so as a bobbin is moved into the sloughing station by the rotation of the magazine, the teeth engage the thread wound upon the bobbin to rotate the bobbin about its own axis. The movement of the magazine also simultaneously brings the threads into contact with the cutting edge of a sloughing knife which is angularly disposed with respect to the axis of the bobbin so that the cutting edge tears open the end of the package of threads wound upon the bobbin.

A still further aspect of the invention is a pneumatic system for distributing jets or streams of air to various locations, thereby to blow away the severed threads which otherwise accumulate until the mechanism becomes jammed thereby. One or more jets are directed towards the base portion of the apparatus to remove severed threads as they are dropped from the sloughing and stripping stations. An additional jet is located at one of the magazine stations so that it blows out any thread or lint accumulated in the spindle holes of the bobbins. Other jets are provided to clear lint and tails from a hollow member or tube which receives the stripped bobbins from the unloading station.

These and other objects and aspects relate to various features of construction and will be apparent from a consideration of the following description and accompanying drawings wherein:

Figure 1:
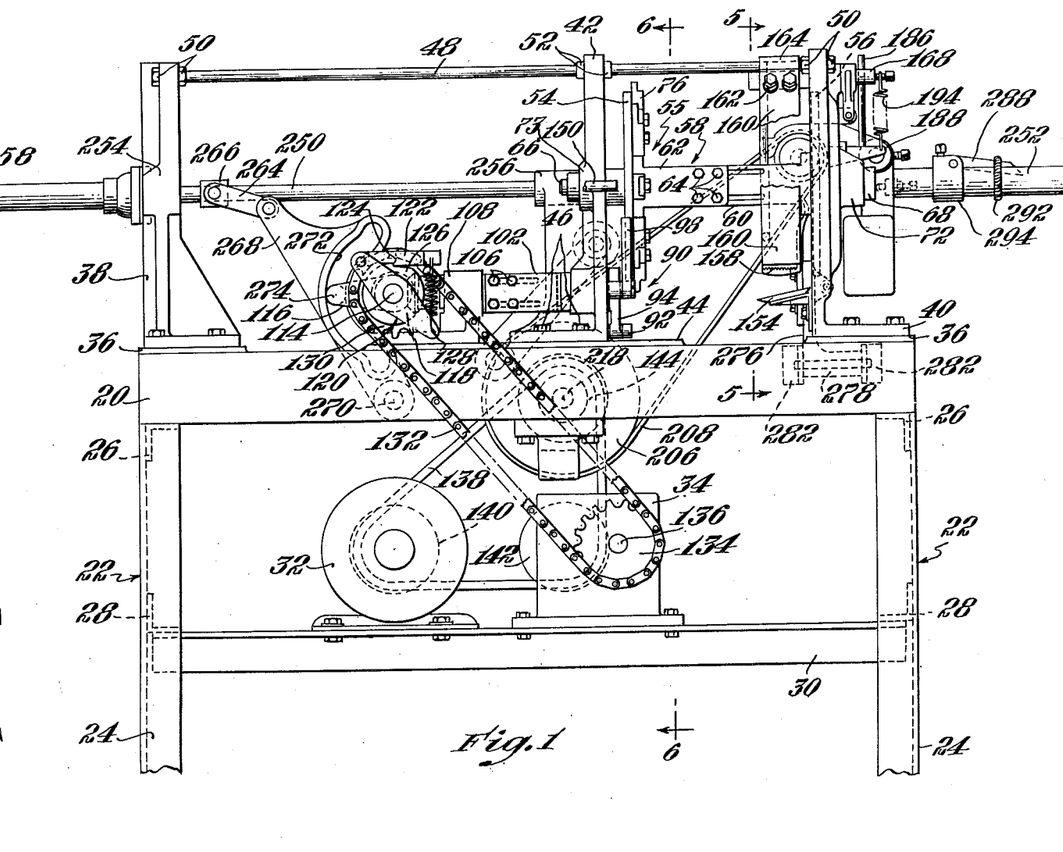
Fig. 1 is a front elevation view of bobbin stripping apparatus embodying the present invention.
Figure 3:
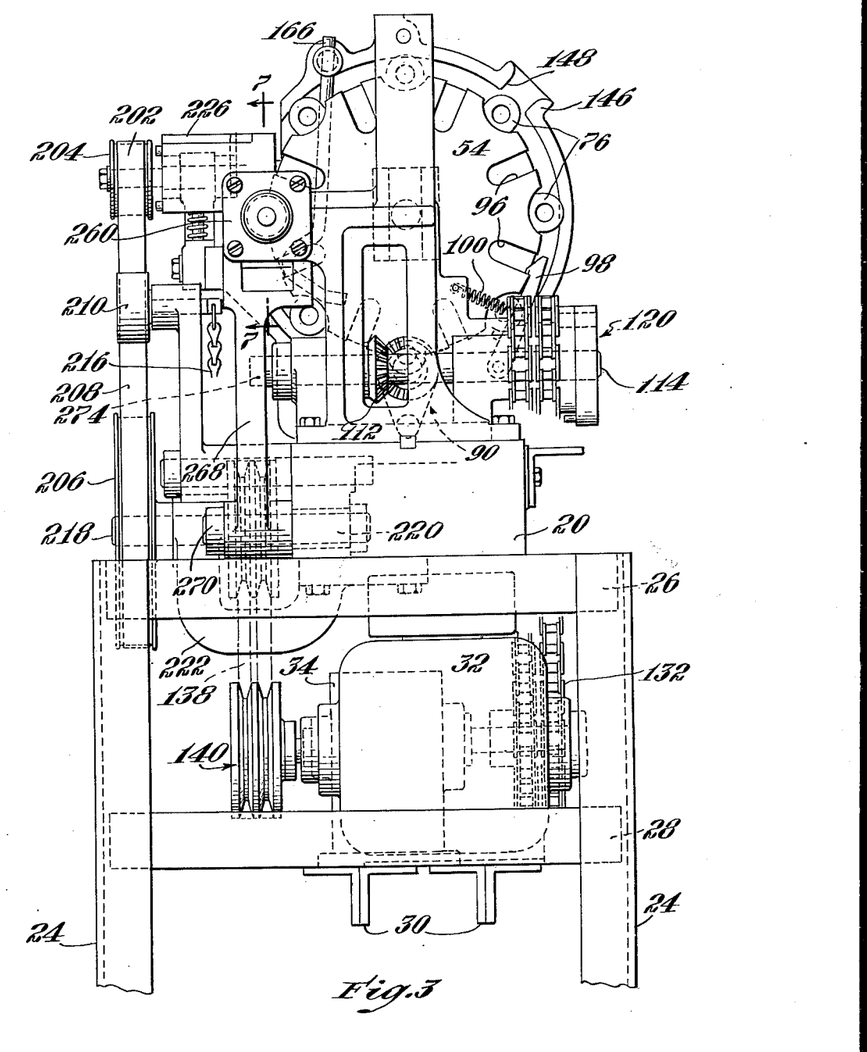
Fig. 3 is a partial end view.

Referring to Fig. 1, the bobbin stripping apparatus illustrated comprises a cast base 20 supported at each end by respective frames 22 fabricated of structural angles. Each frame 22 has two vertical legs 24 connected at the top and at an intermediate position by the cross members 26 and 28, respectively. As is shown in Fig. 3, four angle members, placed back to back in pairs to form two adjacent T-sections 30, extend between the lower cross members 28, thereby to provide a platform for a driving motor 32 and a reduction gear unit 34 whose function will be described in detail hereinafter.

Figure 4:
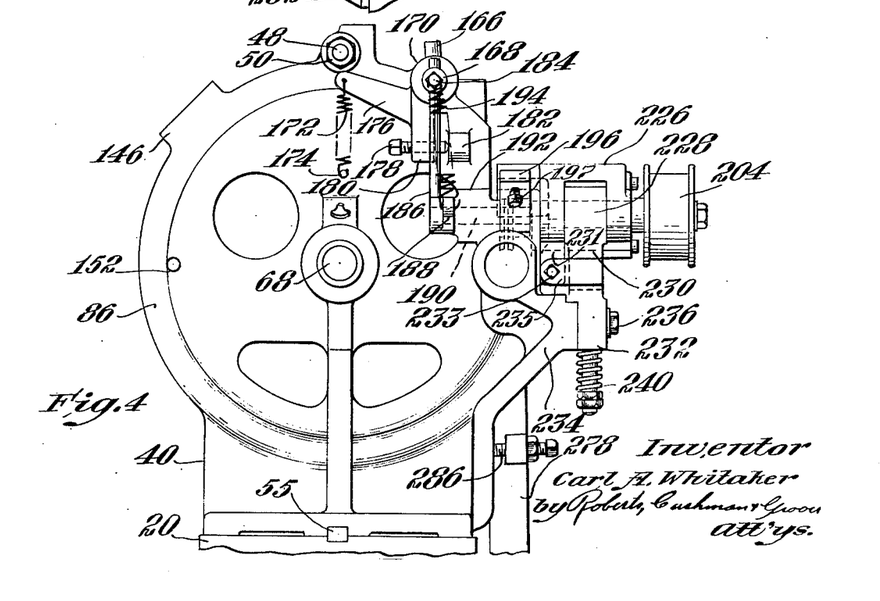
Fig. 4 is a partial view of the opposite end of the apparatus.
Figure 5:
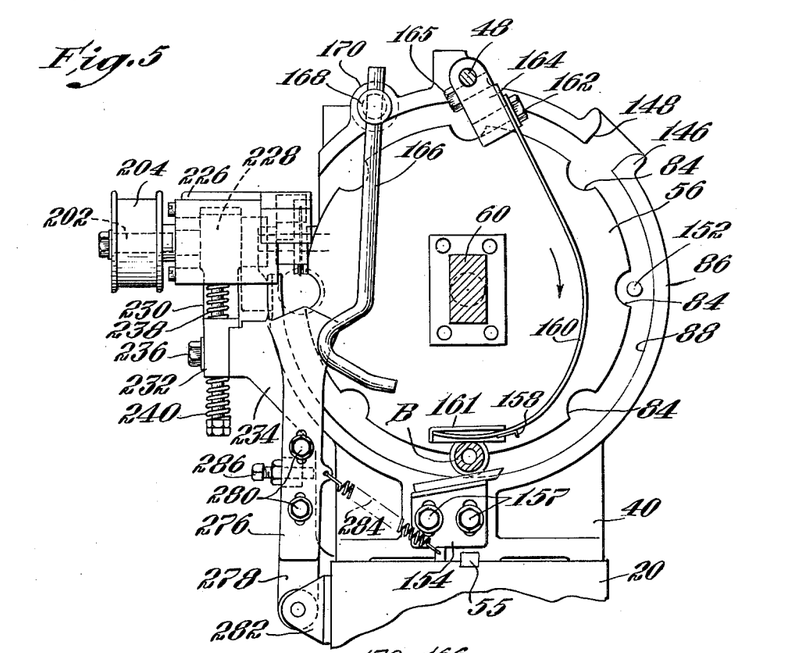
Fig. 5 is a partial sectional view on line 5—5 of Fig. 1.

At each end of the base 20 are cast raised bosses 36 (Fig. 1) whereupon are bolted the brackets 38 and 40, respectively. A third bracket 42 is supported near one end of a third boss 44 positioned upon the top of the base 20 between bosses 38 and 40. The bracket 42 is secured to the boss 44 by means of bolts 46 which engage slotted apertures in the bottom flange of the bracket so that the bracket is slidably adjustable lengthwise of the base 20 to accommodate bobbins of varying lengths as will be described below. As is shown in Figs. 4 and 5, the brackets 40 and 42 are maintained in alignment by means of keys 55. Additional rigidity is furnished by a tie rod 48, the ends of which are secured in apertures in the top of brackets 38 and 40 by means of the nuts 50. The bracket 42 is slidably attached to the rod 48 by means of set screw collars 52 in the end of an arm vertically extending from the bracket 42.

Figure 12:
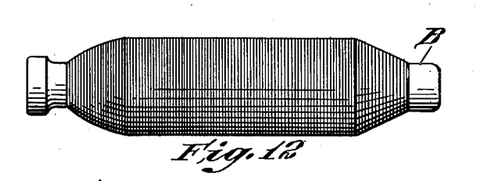
Fig. 12 is a side elevation view of a full wound bobbin or package.
Figure 13:
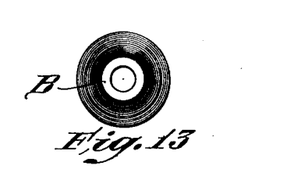
Fig. 13 is an end view of the package shown in Fig. 12.

Rotatably journaled in the brackets 40 and 42 is a magazine 55 (Fig. 1) adapted to hold a plurality of warp bobbins B similar to the one shown in Figs. 12 and 13. The magazine 55 comprises two discs 54 (Fig. 6) and 56 (Fig. 5) coupled by a rectangular shaft 58 (Fig. 1) whose length is adjustable so that bobbins of varying length can be accommodated. Such adjustment is obtained by telescoping a slotted inner member 60 (Fig. 5) within two plate members 62 (Fig. 6) attached to disc 54 by dowels and cap screws. Relative axial movement between the members 60 and 62 is prevented by means of the bolts 64 which pass through apertures in the plate members 62 and slots in the inner member 60. The magazine 55 is rotatably supported upon trunnions 66 and 68 which are integral with the inner member 60. The trunnions 66 and 68 are journaled in bosses 70 and 72 in the brackets 42 and 40 respectively.

Figure 6:
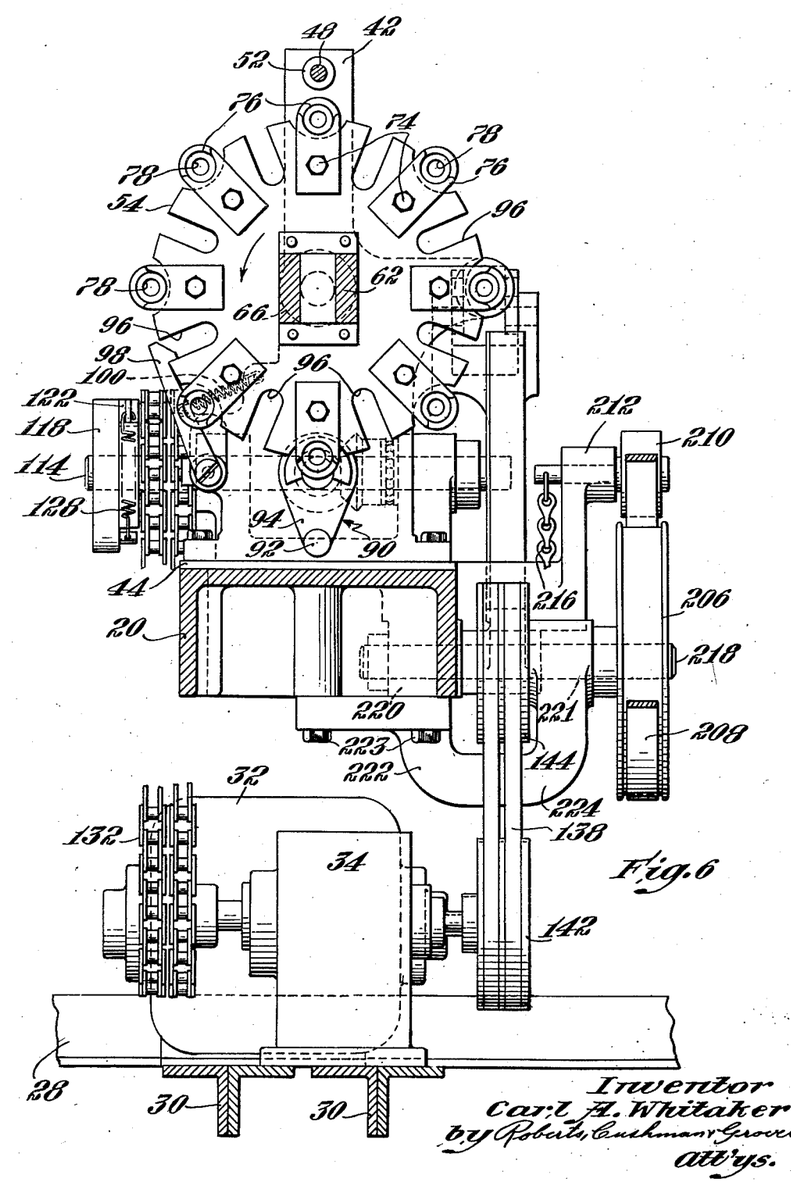
Fig. 6 is a sectional view on line 6—6 of Fig. 1.

As is best shown in Fig. 6, the disc 54 has fastened thereto by means of bolts 74 eight equally spaced radially extending lugs 76. The projecting end of each lug 76 has an aperture 78 (Fig. 8) therein which has an inwardly facing conical countersunk portion 80 adapted to receive one end of a bobbin B. Each lug 76 is cut away as at 82 to provide a shoulder having a concave contour, thereby to facilitate the insertion of the bobbin end into the aperture 78. In axial alignment with each of the apertures 78 is a recess 84 (Fig. 5) cut in the periphery of the disc 56 with a circular contour to accommodate the opposite end of the bobbin B. The bobbins B are retained in the recesses 84 by means of a cover plate 86 which is cast integrally with the bracket 40. The cover 86 has a large circular recess 88 in its inner face wherein is located the disc 56, the diameter of the recess 88 being such that a bobbin B, such as shown in the bottom station in Fig. 5, is maintained in the correlated recess 84 by the wall of recess 88.

The magazine 55 is driven in a clockwise direction (Fig. 5) with an intermittent motion by a Geneva movement 90 (Figs. 2 and 6) comprising a roller 92 carried at the end of an arm 94 so that the roller engages radially disposed slots 96 in the disc 54 upon rotation of the arm. During the dwell periods, the magazine 55 is locked by a detent 98 which is pivotally attached to the bracket 42 so that a spring 100 forces the opposite end of the detent into the adjacent slot 96.

The arm 94 is carried upon the projecting end of a shaft 102 (Fig. 2) which is journaled in a bearing in the lower portion of the bracket 42. The opposite end of the shaft 102 is bifurcated to telescope with a tongue upon one end of a shaft 104. The tongue is slotted to engage bolts 106 which prevent relative axial movement between the shafts 102 and 104, this construction allowing adjustment of the overall shaft length so that the bracket 42 can accommodate bobbins B of varying lengths.

The shaft 104 is journaled in a bearing block 108 which is bolted to the base boss 44. At the end of the shaft 104 opposite the tongue is attached a bevel gear 110 which mates with a second bevel gear 112 carried on a shaft 114 disposed normally to the shaft 104. The shaft 114 is journaled in two bearings also carried in the bearing block 108. One end of the shaft 114 carries a crank arm 116 (Fig. 2) whose function will be described in detail hereinafter.

The opposite end of the shaft 114 is fastened to a driven arm 118 (Fig. 1) of an overload clutch 120. Pivotally connected to one end of the arm 118 is a latch member 122 having a detent offset 124 which engages a similar offset in a driving member 126 which is free to turn upon the shaft 114. The detent offsets are kept in contact by means of a tension spring 128 which extends between the free end of the arm 118 and the latch member 122, respectively, so that whenever the torque upon the driven member exceeds a predetermined amount the detents portions disengage and the clutch slips. The driving member 126 is attached to a double sprocket 130 which is also free to turn upon the shaft 114. The sprocket 130 is coupled by means of two chains 132 to a double sprocket 134 upon the output shaft 136 of the reduction gear unit 34. Power is transmitted from the electric motor 32 to the reduction gear unit 34 by means of a double V-belt 138 which passes over a double driving sheave 140 upon the shaft of the motor 32, a double sheave 142 upon the input shaft to the gear unit 34 and a driven double sheave 144 which drives a rotary stripping knife, as will be described in detail hereinafter.

The above described drive operates continuously during the operation of the machine to rotate the magazine 55 in a series of intermittent steps, each of which positions the bobbins B carried by the magazine at successive stations around the periphery thereof. The first station is the loading station at which the operator manually feeds the bobbins B to be stripped into the magazine. Towards this end the upper portion of cover plate 86 (Fig. 5) is provided with a boss 146 having a slot 148 therein connecting with the circular aperture 88. To insert a bobbin B the operator first places one end thereof in the conical aperture 80 (Fig. 8) in the adjacent lug 76 carried upon the disc 54 (Fig. 6) and then slides the other end of the bobbin through the slot 148 (Fig. 5) so that it rests in the recess 84 in the disc 56.

The next rotary step of the magazine 55 by the Geneva motion, as described heretofore, brings the bobbin B, inserted as above, into an air jet station. At this station a conduit 150 (Fig. 1) directs a jet or stream of air from a conventional compressed air supply (not shown) through the aperture 78 (Fig. 8) in the lug 76, thereby to blow out through a corresponding aperture 152 (Fig. 5) in the cover plate 86 any thread or lint which might otherwise interfere with proper placement of the bobbin upon a spindle.

No operation is performed upon the bobbin at the third station. The next station is a sloughing station in which the end of full or partially wound packages are ripped open to facilitate the stripping of the bobbin, as described in detail hereinafter. If the machine is to be used only to strip tails from the bobbins, this station which is described immediately below, may be omitted thereby simplifying the machine.

Figure 14:
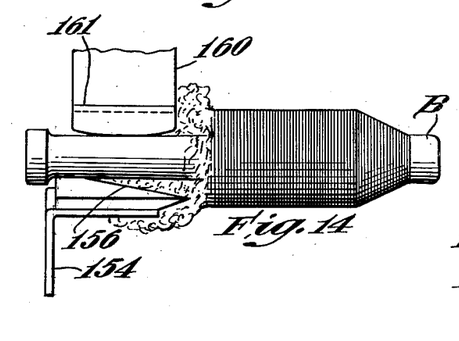
Fig. 14 is a fragmentary side elevation view showing the manner in which the sloughing knife engages the end of a package.
Figure 15:
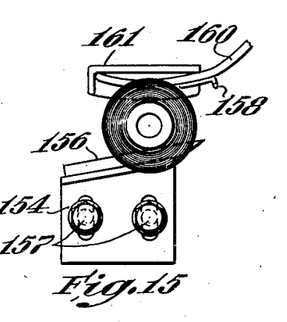
Fig. 15 is a fragmentary end view of the sloughing knife engaging the package.

The sloughing station comprises a sloughing knife 154 (Fig. 5) fastened to the bracket 40 by means of bolts 157. The apertures through which the bolts 157 pass are slotted so that the vertical position of the knife 154 is adjustable, thereby to bring an angularly disposed cutting edge 156 (Fig. 14) into position to engage the threads upon the end of a package by the rotation of the magazine 55, as is shown in Figs. 14 and 15. The bobbin B is also rotated about its own axis as the thread is brought into contact with the cutting edge 156 by means of teeth 158 (Fig. 15) near the free end of a cantilever member 160 (Fig. 5).

The member 160 is a yieldable curved strip of metal at the lower end of which is a backing or reinforcing strip 161 with an angularly disposed forward portion which cooperates with the knife 154 to slough the thread. The other end of the member 160 is adjustably secured to a block 164 by bolts 162 which pass through slots in the member to engage threaded apertures in the block. The block 164 is pivotally supported upon the tie rod 48 passing through an aperture in the block. The block 164 is locked, by means of bolts 165, in the required position upon the rod 48 to bring the teeth 158 into engagement with the threads upon the bobbin B.

Figure 2:
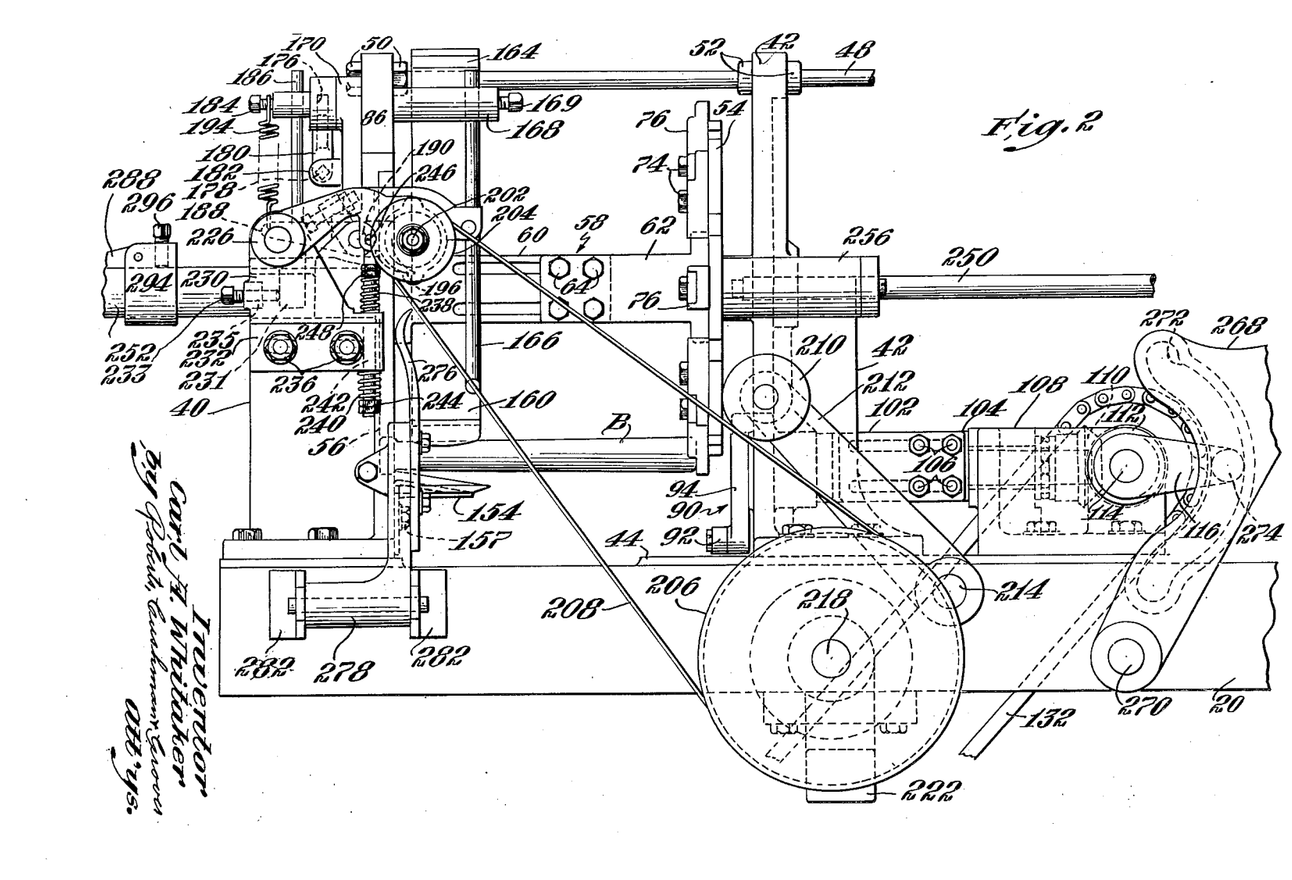
Fig. 2 is a partial elevation view of the opposite side of the apparatus shown in Fig. 1.

The fifth station does not perform any operation other than positioning the bobbin B immediately below a trip lever 166. As the bobbin B is moved from the fifth station to a combined stripping and unloading station, the bobbin B contacts the lever 166 which is secured in an aperture in the end of a shaft 168 by means of a set screw 169 (Fig. 2). This arrangement permits adjustment of the lever length so that contact of the hooked lever end by the bobbin rotates the shaft 168 which is journaled in a boss 170 near the top of the cover plate 86. The lever 166 is biased in the position shown in Fig. 5 by a spring 172 (Fig. 4) extending between a pin 174 fixed to the cover plate 86 and the end of an arm 176 fastened to the shaft 166. The rotation of the shaft 168 by the biasing action of the spring 172 is limited by a stop such as the adjustment screw 178 which is threaded into an extension 180 from the arm 176 so that the screw end contacts a boss 182 cast integrally with the cover plate 86.

A set screw 184 adjustably secures the upper end of a rod 186 in an aperture near the outer end of the shaft 168. The lower end of the rod 186 contacts the top of an arm 188 which is fastened to the end of a shaft 190 journaled in a boss 192 projecting from the cover plate 86. The arm 188 is maintained in contact with the end of the rod 186 by a spring 194 which extends between the end of the arm and the set screw 168.

Figures 7, 8, 9, 10, 11:
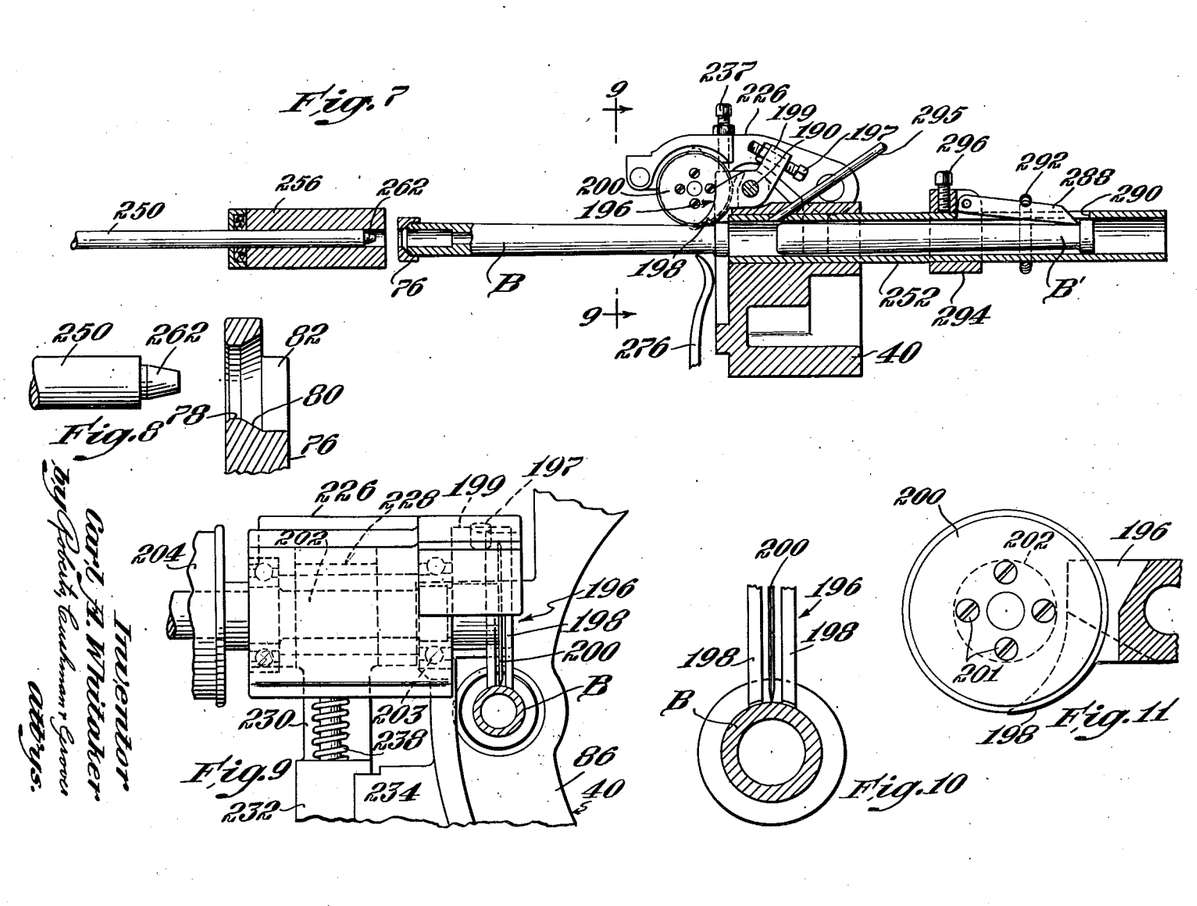
Fig. 7 is a fragmentary section view on line 7—7 of Fig. 3 showing a bobbin in the stripping and unloading station.
Fig. 8 is an enlarged fragmentary view in partial section showing the details of the end of the ram and the aperture in the magazine for holding a bobbin.
Fig. 9 is a partial sectional view on line 9—9 of Fig. 7.
Fig. 10 is an enlarged fragmentary view in partial section showing the relationship of the rotary knife and the presser foot.
Fig. 11 is an enlarged fragmentary elevation view of the rotary knife.

The opposite end of the shaft 190 carries a bifurcated presser foot 196 (Figs. 7 and 9).

When the bobbin B contacts the trip lever 166 (Fig. 2), the rod 186 releases the arm 188 so that the tines 198 (Fig. 7) at the bifurcated end of the presser foot 196 descends until the foot is restrained by a stop comprising an adjustable screw 197 engaging the threads in an aperture near the end of a rearwardly projecting finger 199 so that the end of the screw contacts a rotary knife housing 226 which will be described in detail hereinafter. As the rotation of the magazine 55 raises the bobbin B, the presser foot 196 is raised, moving the arm 188 back against the force exerted by the spring 194 (Fig. 4) so that the rod 186 is reset by the spring 172.

A power driven rotary knife 200 (Fig. 11) is secured by four screws 201 to one end of a shaft 202 which has an axial projection or arbor for engaging a central aperture in the knife so that it is coaxially positioned with respect to the other end of the shaft 202 which carries a pulley 204 (Fig. 9). The pulley 204 is driven from a larger pulley 206 (Fig. 2) by means of a flat belt 208 which also passes under a tension regulating idler pulley 210 carried upon one end of an arm 212. The other end of the arm 212 is pivotally secured to the base 20, as at 214. The movement of the arm 212 is limited by a chain 216 (Fig. 6) which is tied to the base 20.

The large driving pulley 206 is secured to the projecting end of a shaft 218 which is journaled in bearings 220 and 221 (Fig. 6) carried by a bearing bracket 222. The bracket 222 comprises a body portion carrying the innermost bearing 220 which is attached to the bottom of the base 20 by the bolts 223 and a gooseneck portion 224 which projects outwardly from the base to support the outboard bearing 221. The pulley 144 (Fig. 1), driven from the motor 32 by the V-belts 138, as described heretofore, is attached to the shaft 218 between the bearings 220 and 221, the gooseneck portion 224 providing the necessary clearance whereby operation of the motor 32 drives the rotary knife 200 at high speed.

The shaft 202 (Fig. 9) carrying the pulley 204 and the rotary knife 200 at its respective ends is journaled in bearings such as the ball bearings 203 secured in the housing 226. The end of the housing 226 opposite the shaft supporting end is bifurcated thereby pivotally connecting with a boss 228 (Fig. 4) at the end of an arm 230 extending vertically from a bracket 232. The downward movement of the rotary knife 200 is limited by a screw 233 which engages a threaded aperture in an arm 235 extending horizontally from the arm 230 so that the end of the screw contacts a finger 231 extending downwardly from one of the bifurcated portions of the housing 226. The bracket 232 is slidably attached to a projecting portion 234 of the bracket 40 by means of the bolts 236 which project through slots in the bracket to engage threaded apertures in the projecting portion 234 of bracket 40 so that the position of the knife 200 is adjusted horizontally by movement of the housing 226 and the bracket 232.

The rotary knife 200 is located between the tines 198 of the presser foot 196, as is shown in Figs. 9 and 10, the relative position thereof being determined by an adjustable stop comprising a set screw 237 (Fig. 7) which engages a threaded aperture in the housing so that the end of the screw contacts the top of the presser foot 196. The end of the screw 237 is yieldably maintained in contact with the presser foot 196 by difference in the forces exerted by springs 238 and 240 (Fig. 2). The spring 240 is compressed between the bottom of the bracket 232 and nuts 244 which are in threaded engagement with the lower end of a rod 242. The rod 242 extends vertically upward through an aperture in the bracket 232 to engage pivotally, as at 246, the housing 226 so that the force exerted by the spring 240 pivots the housing 226 to bring the rotary knife down until the end of the screw 237 contacts the top of the presser foot 196. Such pivoting of the housing 226 is opposed by the second spring 238 which is compressed between the top of the bracket 232 and nuts 248.

The bottom of the lower ends of the tines 198 (Fig. 10) of the presser foot 196 are concave so that they conform generally to the contour of the bobbin B as the foot 196 is forced against the bobbin B by the spring 194 upon being released by operation of the trip lever 166, as has been described in detail heretofore. By proper adjustment of the screw 237, the rotary knife 200 can be lowered between the tines 198 so that the knife will cut the final layer of thread wound upon the bobbin B without cutting the bobbin itself.

Relative axial movement between the bobbin B and the rotary knife 200 is caused by a ram or plunger 250 (Figs. 2 and 7) which reciprocates in synchronism with the rotation of the magazine, as described below, to force the bobbin B in the stripping and unloading station into a hollow member such as the conduit 252. The plunger 250 is slidably restrained in bosses 254 (Fig. 1) and 256 in the brackets 38 and 42, respectively. The end of the plunger 250 extending beyond the boss 254 is enclosed in a guard such as the tube 258 which is closed at its extended end by a cap 260 (Fig. 3). The opposite end of the plunger 250 is provided with a tip 262 (Fig. 8) which upon movement of the plunger, passes through the aperture 78 in the disc lug 76 to engage the end of the spindle hole in the bobbin B in the stripping and unloading station.

The force for reciprocating the plunger 250 is applied through a link 264 (Fig. 1), one end of which is pivotally connected to a crosshead 266 fastened to the plunger adjacent the boss 254. The opposite end of the link 264 is pivotally connected to a projecting arm of a cam plate 268, the other end of the plate being pivotally connected to the base 20, as at 270.

The cam plate 268 has a cam groove 272 which engages a roll 274 upon the end of the crank arm 116 which is rotated by the motor 32 as has been described in detail heretofore. The main portion of the cam groove 272 is circular, having the same radius of curvature as the locus of the circle made by the crank pin 274 so that during the upward portion of the crank arm's motion the plunger 250 remains in a retracted position. The Geneva movement 90 is synchronized with the travel of the plunger 250 so that movement of the magazine 55 takes place while the plunger is in such retracted position. As the crank arm 116 completes its downward movement the plunger 250 is moved forward and then returned. Because of the difference in the distance between the pivot point 270 and the crank pin 274 during the forward and return strokes of the plunger 250, the no load return stroke is considerably faster than the forward stroke.

As the bobbin B is forced into the tube 252 during the forward stroke of the plunger 250, the rotary knife 200 severs the thread wound upon the bobbin. The severed threads are stripped from the bobbin B by plough 276 (Fig. 5) having a pointed end extending upwardly beneath the bobbin B when it is the stripping and unloading station. The severed threads fall to the base 20 from which they are blown by several air jets (not shown).

The height of the plough 276 is made adjustable by securing the shank thereof to a supporting member 278 by means of the cap screws 280 which project into the member 278 through slotted apertures in the shank. The supporting member 278 is pivotally mounted in brackets 282 upon the side of the base 20 so that the movement of a bobbin B into the stripping and unloading station forces the plough 276 outwardly to permit the bobbin to pass, whereupon a spring 284 extended between a pin upon the base 20 and the plough shank returns the plough to its operating position. Such position is determined by the adjustment of a screw 286 which engages a threaded aperture in the supporting member so that its end contacts the side of the bracket 40.

As is shown in Fig. 7, the bobbins B are successively moved into the tube 252 and thence out the open end to drop into a container (not shown) by successive strokes of the plunger 250. As the plunger 250 forces a bobbin into the position occupied by B', a detent or latch 288 is drawn through a slot 290 by a spring 292 to engage the head at the end of the bobbin B' whereby the bobbin B' is restrained so that the tip 262 can be withdrawn from the spindle hole. The detent location is made adjustable for bobbins of various lengths by pivoting the end thereof on a collar 294 which is slidably arranged about the outside of the tube 252. A screw 296 locks the collar 294 in the adjusted position. The severed threads which tend to accumulate in the tube 252 thereby to jam the plunger 250 are cleared by a jet of air from the tube 295.

Assuming that the motor 32 has been energized and that the position of the bracket 42 (Fig. 1) and the length of shafts 58 and 102 has been adjusted as has been described heretofore so that the magazine 55 will accommodate bobbins of the desired length, the bobbin stripping apparatus operates as follows: During the dwell period of the Geneva movement 90, the operator manually inserts a bobbin B to be stripped, which may have either a full or partial package or tails wound thereupon, into the magazine 55 at the loading station by first inserting the end of the bobbin in the conical aperture 80 (Fig. 8) in the lug 76 and then dropping the head end of the bobbin into the slot 148 (Fig. 5). The inserted bobbin is then moved by the Geneva movement to the air jet station wherein a stream of air from the conduit 150 (Fig. 1) blows any lint or thread from the spindle hole of the bobbin.

Figure 16:
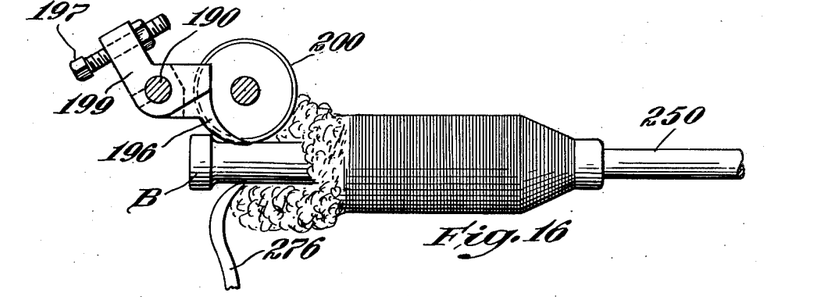
Fig. 16 is a fragmentary side elevation view showing the rotary knife engaging the sloughed end of a package at the beginning of the stripping operation.
Figure 17:
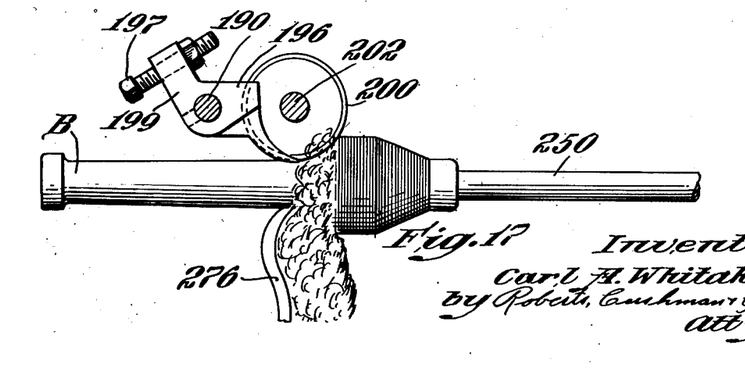
Fig. 17 is a fragmentary side elevation view showing the relative position of the rotary knife and bobbin near the end of the stripping operation.

Further intermittent rotation of the magazine 55 brings the bobbin into the sloughing station. If the bobbin carries only tails, no operation takes place at this station. If the package is completely or partially wound, the thread thereupon engages the teeth 158 (Fig. 15) at the end of the cantilever member 160 so that the bobbin is rotated about its own axis as the thread comes into contact with the cutting edge 156 of a sloughing knife 154. The combined action of the knife 154, plow 161 and the toothed member 160 rips or sloughs the threads at the end of the package so that the rotary knife 200 (Fig. 7) can be started into the end, as shown in Fig. 16. The magazine 55 then moves the bobbin B into the stripping and unloading station during which travel the bobbin contacts the trip lever 166 (Fig. 5) which drops the presser foot 196 and the rotary knife 200 down upon the top of the bobbin (Figs. 7 and 16) as has been described heretofore. The cam plate 268 (Fig. 1) which is synchronized with the rotation of the magazine 55 then moves the plunger 250 into contact with the end of the bobbin B to force the bobbin into the tube 252 (Fig. 7) where it is restrained by the detent 288 as the plunger is returned, the rotary knife 200 and the plough 276 stripping the bobbin B bare as it is forced therebetween.

The above described stripping operation assumed that the bobbins B have been properly wound. However, because of the shape of the tines 198 (Fig. 10) and spring loading of the presser foot 196, the rotary knife will strip threads improperly wound upon the collar (Fig. 16) and the connecting neck portion of the bobbin B even though such threads have not been sloughed by the knife 154. The spring loading of the presser foot 196 also makes it possible to strip bobbins having a tapered body as well as the cylindrical bobbins B illustrated.

It should be understood that the present disclosure is for the purpose of illustration only and that this invention includes all modifications and equivalents which fall within the scope of the appended claims.

I claim:

1. Apparatus for stripping thread from a bobbin comprising holding means for releasably holding the bobbin, thread stripping means including a knife for severing the thread upon the bobbin and an oppositely disposed plow for removing the several threads, and means for effecting relative movement between the holding means and the stripping means so that the plow and knife are brought into operating engagement with the thread on the bobbin.

2. Apparatus for stripping thread from bobbins comprising a magazine for holding a plurality of bobbins at the periphery thereof, a plurality of stations circumferentially positioned about said magazine including a loading station, a thread sloughing station, and a thread stripping and unloading station, means for rotating the magazine successively to present the bobbins to the respective stations, and means for removing the bobbins from the magazine after the thread has been stripped therefrom.

3. Apparatus for stripping thread from bobbins comprising a magazine for the bobbins including two axially aligned discs, one of which has a plurality of apertures circumferentially located at equally spaced intervals for receiving one end of the respective bobbins, the other discs having a plurality of recesses in the periphery thereof corresponding to the apertures in the first disc for receiving the opposite end of the respective bobbins, a shaft connecting the discs to maintain the apertures and correlated recesses in axial alignment, and a cover member positioned to enclose the periphery of the second disc so that the bobbin ends are restrained in the respective recesses; a plurality of stations including a thread stripping station; means for moving the magazine successively to present the bobbins to the respective stations; and means for removing the bobbins from the magazine after the thread has been stripped therefrom.

4. Apparatus for stripping thread from bobbins comprising a magazine for the bobbins including two axially aligned discs, one of which has a plurality of apertures circumferentially located at equally spaced intervals for receiving one end of the respective bobbins, the other disc having a plurality of recesses in the periphery thereof corresponding to the apertures in the first disc for receiving the opposite end of the respective bobbins, a shaft connecting the discs to maintain the apertures and correlated recesses in axial alignment, and a cover member positioned to enclose the bobbin ends are restrained in the respective recesses; a plurality of stations including a thread stripping station; a Geneva movement having a crank arm with a roll at the end thereof for intermittently moving the magazine successively to present the bobbins to the respective stations, slots for engaging the roll being cut in the first disc midway between the respective bobbin restraining apertures; and means for removing the bobbins from the magazine after the thread has been stripped therefrom.

5. Apparatus for stripping thread from bobbins comprising a magazine for holding a plurality of bobbins; a plurality of stations including a thread stripping and unloading station, means for rotating the magazine successively to present the bobbins to the respective stations, a plunger for contacting the end of the bobbin in the unloading station, a hollow member for receiving the bobbins as they are removed from the magazine at the unloading station by the plunger, and a detent for restraining the removed bobbin in the hollow member so that the plunger can be withdrawn.

6. Apparatus for stripping thread from bobbins comprising a magazine for holding a plurality of bobbins; a plurality of stations including a thread stripping and unloading station, means for rotating the magazine successively to present the bobbins to the respective stations, a plunger operated by a quick return cam synchronized with the rotation of the magazine for contacting the end of the bobbin in the unloading station, a hollow member for receiving the bobbins as they are removed from the magazine at the unloading station by the plunger, and a detent for restraining the removed bobbin in the hollow member so that the plunger can be withdrawn.

7. Apparatus for stripping thread from bobbins comprising a magazine for the bobbins including two axially aligned discs, one of which has a plurality of apertures circumferentially located at equally spaced intervals for receiving one end of the respective bobbins, the other disc having a plurality of recesses in the periphery thereof corresponding to the apertures in the first disc for receiving the opposite end of the respective bobbins, a shaft connecting the discs to maintain the apertures and correlated recesses in axial alignment, and a cover member positioned to enclose the periphery of the second disc so that the bobbin ends are restrained in the respective recesses; a plurality of stations including a loading station with a slot in the cover member so that the bobbins can be inserted in the magazine, and a thread and unloading station; means for moving the magazine successively to present the bobbins to the respective stations; and unloading means for removing the bobbins from the magazine at the unloading station after the thread has been stripped therefrom, said unloading means including a cam operated plunger synchronized with the movement of the magazine for contacting the end of the bobbin in the unloading station, a hollow member for receiving the bobbins as they are removed from the unloading station by the plunger and a detent for restraining the removed bobbin in the hollow member so that the plunger can be withdrawn.

8. Apparatus for stripping thread from bobbins comprising a magazine for holding a plurality of bobbins at the periphery thereof, a plurality of stations circumferentially positioned about said magazine including a thread sloughing station having a knife with a blade angularly disposed with respect to the axis of the bobbin so that the blade sloughs the thread as the magazine is rotated, a thread stripping station having a power driven rotary knife for cutting the thread from the bobbin and an oppositely disposed plow for ripping the severed thread from the bobbin, means for rotating the magazine successively to present the bobbins to the respective stations, and means for removing the bobbins from the magazine after the thread has been stripped therefrom.

9. Apparatus for stripping thread from bobbins comprising a magazine for holding a plurality of bobbins, a plurality of work stations including a loading station, a thread sloughing station and a thread stripping station and an unloading station, means for moving the magazine successively to present the bobbins to the respective work stations, and means for removing the bobbins from the magazine after the thread has been stripped therefrom.

10. Apparatus for stripping thread from bobbins comprising a magazine for holding a plurality of bobbins at the periphery thereof, a plurality of work stations circumferentially positioned about said magazine including a loading station, a thread sloughing station and a thread stripping station and an unloading station, means for rotating the magazine successively to present the bobbins to the respective work stations, and means for removing the bobbins from the magazine after the thread has been stripped therefrom.

11. Apparatus for stripping thread from bobbins comprising a magazine for holding a plurality of bobbins at the periphery thereof; a plurality of work stations circumferentially positioned about said magazine including a loading station, a thread sloughing station having a yieldable cantilever member secured at one end and with a series of teeth at its free end arranged to engage the thread upon each bobbin as it is moved into the sloughing station by the rotation of the magazine so that a rotary motion is imparted to the bobbin, and a knife angularly disposed with respect to the axis of the bobbin for sloughing the end portion of the thread upon the bobbin as it is subjected to the rotary motion, and a thread stripping station; means for moving the magazine successively to present the bobbins to the respective work stations, and means for removing the stripped bobbins from the magazine after the thread has been stripped therefrom.

12. Apparatus for stripping thread from bobbins comprising a magazine for holding a plurality of bobbins at the periphery thereof, a plurality of work stations circumferentially positioned about said magazine including a station having an air jet for removing lint and thread from the spindle apertures in the respective bobbins, a loading station, a thread sloughing station and a thread stripping and unloading station, means for rotating the magazine successively to present the bobbins to the respective work stations, and means for removing the bobbins from the magazine after the thread has been stripped therefrom.

13. Apparatus for stripping thread from bobbins comprising a magazine for the bobbins including two axially aligned discs, one of which has a plurality of apertures circumferentially located at equally spaced intervals for receiving one end of the respective bobbins, the other disc having a plurality of recesses in the periphery thereof corresponding to the apertures in the first disc for receiving the opposite end of the respective bobbins, a shaft connecting the discs to maintain the apertures and correlated recesses in axial alignment and a cover member positioned to enclose the periphery of the second disc so that the bobbin ends are restrained in the respective recesses; a plurality of work stations including a station having a jet of air through the disc aperture positioned in such station thereby removing any lint or thread in the spindle aperture in the bobbin carried in such aperture, a loading station, and a thread stripping and unloading station; a means for moving the magazine successively to present the bobbins to the respective work stations; and means for removing the bobbins from the magazine after the thread has been stripped therefrom.

14. In bobbin stripping apparatus supporting means for holding a bobbin, a sloughing knife having a cutting edge angularly disposed with respect to the axis of the bobbin for severing the thread wound thereupon, means for relatively moving the supporting means with respect to the knife to bring the cutting edge into engagement with the threads, and means for rotating the bobbin as the thread is severed so that the angularly disposed cutting edge severs the thread with a sloughing action.

15. In bobbin stripping apparatus supporting means for holding a bobbin, an instrumentality having a cutting edge for severing the thread wound upon the bobbin, means for relatively moving the supporting means with respect to the instrumentality to bring the cutting edge into engagement with the threads, and means for rotating the bobbin as the thread is severed so that the cutting edge severs the thread with a sloughing action.

16. In bobbin stripping apparatus supporting means for holding a bobbin, a sloughing knife having a cutting edge for severing the thread wound upon the bobbin, means for relatively moving the supporting means with respect to the knife to bring the cutting edge into engagement with the threads, and means including a yieldably mounted member having teeth for engaging the thread wound upon the bobbin as the supporting means is moved with respect to the knife thereby to rotate the bobbin as the thread is severed so that the cutting edge severs the thread with a sloughing action.

17. A bobbin stripping apparatus comprising: a rotary bobbin magazine including a horizontal shaft, a pair of spaced vertical disks carried by said shaft and each having peripheral circumferentially spaced bobbin supporting means; a bobbin loading station; a bobbin stripping and unloading station; means for intermittently rotating said magazine whereby bobbins loaded therein at said loading station are presented successively at said stripping and unloading station; stripping means mounted at said stripping and unloading station adjacent one of said disks and above a horizontal plane passing through said shaft, said stripping means comprising a power driven rotary cutter disk so positioned as to be capable of cutting the thread remaining on a bobbin presented at said stripping and unloading station without cutting the surface of the bobbin; a reciprocating horizontal plunger mounted outside said magazine in alignment with said stripping and unloading station; and means to operate said plunger in timed relation with said magazine rotating means whereby to engage an end of a bobbin at said stripping and unloading station and move said bobbin endwise past said stripping means to cut the thread thereon and eject said bobbin from said magazine.

CARL F. WHITAKER.

REFERENCES CITED

The following references are of record in the file of this patent:

UNITED STATES PATENTS

| Number | Name | Date |
|---|---|---|
| 1,070,751 | Tower | Aug. 19, 1913 |
| 1,106,239 | Peterson | Aug. 4, 1914 |
| 1,109,949 | Walsh | Sept. 8, 1914 |
| 1,119,705 | Loner | Dec. 1, 1914 |
| 1,198,314 | Baude | Sept. 12, 1916 |
| 1,722,243 | Davis | July 23, 1929 |
| 2,303,048 | Hudson | Nov. 24, 1942 |
| 2,510,348 | Peterson | June 6, 1950 |